Sept. 28, 1926.
W. J. SMART
VENTILATING AND EXHAUST FAN
Filed Dec. 10, 1921
1,601,456
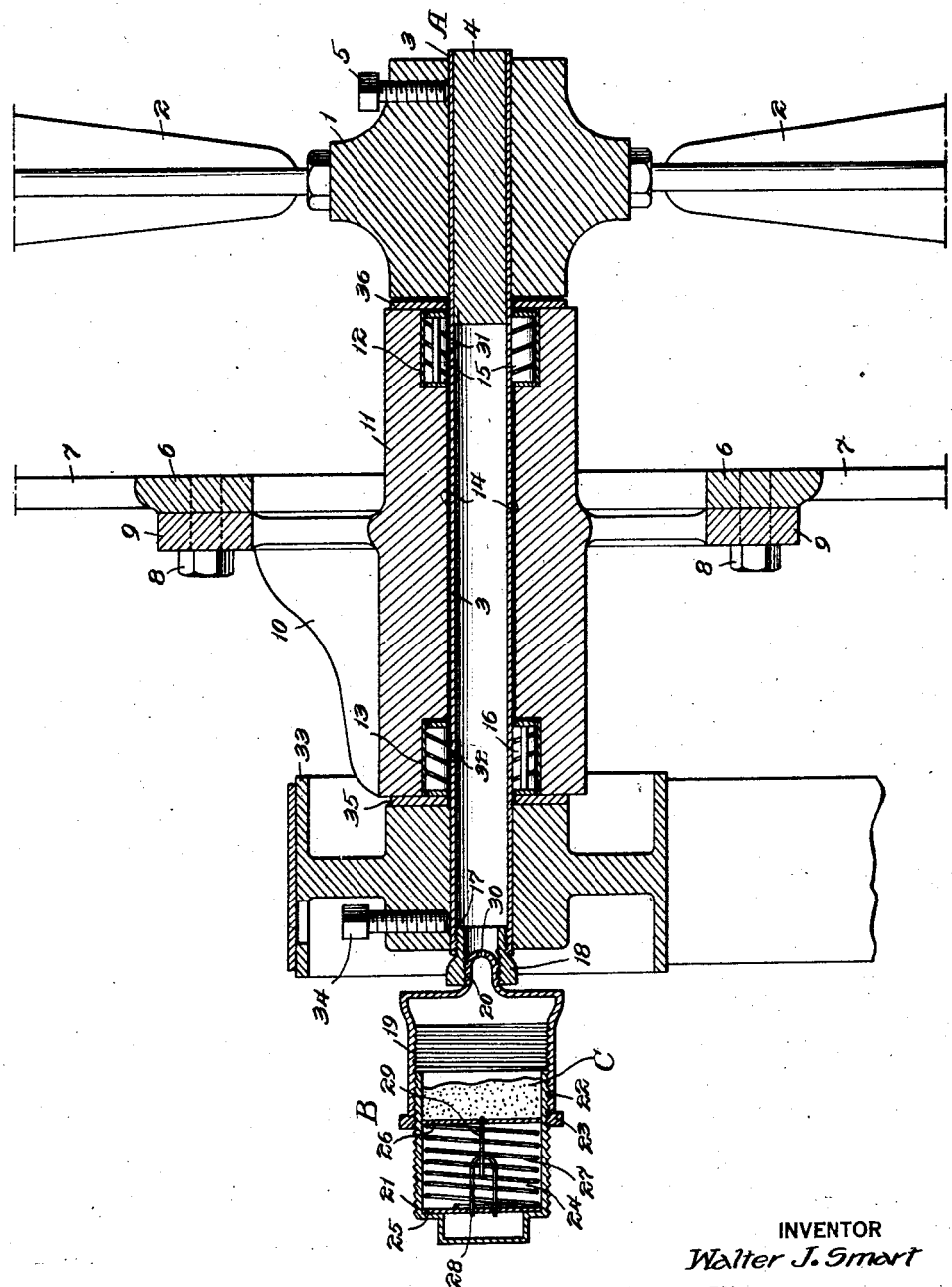
INVENTOR
Walter J. Smart
BY
ATTORNEYS Patented Sept. 28, 1926.

1,601,456

UNITED STATES PATENT OFFICE.

WALTER J. SMART, OF BROOKLYN, NEW YORK, ASSIGNOR TO EUREKA PNEUMATIC SPRAY CO. INC., A CORPORATION OF NEW YORK.

VENTILATING AND EXHAUST FAN.

Application filed December 10, 1921. Serial No. 521,348.

This invention relates to lubricating devices, more particularly to devices for lubricating such machine elements as shafts. The common means for lubricating shafts includes two or more lubricators carried on a fixed bearing housing arranged to feed the lubricant to the bearings. I have, however, found that in certain mechanisms, such as exhaust fans, the lubricant may be most satisfactorily supplied from the inside of the rotating shaft.

An object of my invention is to use a hollow shaft for storing a supply of lubricant so that bearings may be lubricated for a long period without replenishing the supply of grease.

Another object of my invention is to provide an improved lubricating device wherein the grease may be supplied to bearings from the inside of the shaft supported thereby, and more particularly from a grease cup preferably of the compression feed type carried on the end of the shaft. Other objects of my invention include the improving of exhaust fans by equipping them with a device of the above character.

Another object of my invention is to improve exhaust fans and the like by providing them with roller or ball bearings.

In the accompanying drawing, I have shown for purposes of illustration an exhaust fan equipped with one form of my invention. The hub of the exhaust fan is shown at 1, the blades being shown at 2. This hub is fastened to a shaft A which, in the form illustrated, includes a tube 3 provided with a plug 4 at the end adjacent the fan hub. A set screw 5 or any other form of locking device may be used to fix the hub in position.

A ring 6 provided with arms indicated at 7 is used for supporting the fan in a well known manner. This ring is fastened by bolts 8 to a ring 9 carried on arms 10 of a bearing housing 11. The bearing housing 11 is provided with bearing seats 12 and 13 near the ends thereof and with a hole 14 whose diameter is slightly larger than the diameter of the tube 3. The tube 3 is carried in bearings 15 and 16 mounted in the bearing seats 12 and 13 so that the shaft may freely rotate. The bearings illustrated are roller bearings but it is obvious that ball bearings could also be used. The opposite end of the tube 3 of the shaft A is threaded preferably internally as shown at 17, and a grease cup B is threaded into the thread 17. This grease cup includes a nipple 18, an outer cup 19 threaded into the nipple at 20, an inner cup 21 threaded into the outer cup at 22, a lock nut 23 and a compression device 24. The compression device includes two disks 25 and 26, a helical spring 27 and stopping devices 28 and 29 to limit the expansion of the spring 27. The compression mechanism of the grease cup will force the grease, indicated at C, through the aperture 30 into the inside of the hollow shaft and thence through apertures 31 and 32 on to the bearings 12 and 13, respectively. The shaft may be driven by any suitable means such as a pulley 33 fastened to the outside of the tubes by means of a set screw 34. Washers 35 and 36 are placed intermediate the bearing housing and the pulley and fan hubs.

It will be noted that the device which has heretofore been described may be easily manufactured and assembled. The threaded connections for the grease cup are made longitudinally of the shaft instead of transversely in the bearing housing.

It will also be noted that the grease cup as assembled is practically an extension of the shaft. It is carried in such a manner that all parts are symmetrical about the axis of the shaft. Hence, no vibration is set up by rapid rotation of the device. Furthermore, centrifugal force developed by rotating the device does not affect the flow of lubricant. It is also apparent that grease need be renewed only at comparatively long intervals for the inside of the shaft constitutes a large reservoir for lubricant.

In most instances it is standard practice to provide shafts with two bearings spaced apart. I will, therefore, in my claims use the term "bearings" and "bearing seats" in the plural, but I desire it to be understood that the use of a single bearing is comprehended within the claims.

What I claim is:—

1. In an exhaust fan, a rotatable shaft, said shaft being hollow, a plug at one end of said shaft, fan blades fastened to said shaft near one end so as to rotate therewith whereby the plug forms a solid support for said fan blades, bearings supporting the shaft at the hollow portions thereof, apertures in the hollow portion of the shaft, there being an aperture adjacent each bearing whereby to lubricate the bearings from inside the hollow shaft.

2. In an exhaust fan, a rotatable shaft, said shaft being hollow, a plug extending inwardly at one end of said hollow shaft, whereby to form a solid shaft at said end, a fan blade fastened to the shaft at the solid end to rotate therewith, fixed supports having bearing seats, a plurality of bearings supporting the said shaft, the shaft being hollow from the bearings toward the other end, apertures in the hollow portion of the shaft, there being an aperture adjacent each bearing, and a grease cup carried by the shaft to deliver grease into the hollow shaft.

3. In an exhaust fan, a tube having a plug at one end and threaded at the other end, a fixed support, bearing seats, bearings in said seats for supporting said tube, fan blades fixedly mounted on the tube to overlap said plug, there being holes in the tube walls adjacent the bearings, and a grease cup threaded to the end of the tube to deliver grease into the inside of the tube.

4. In an exhaust fan, a tube having a plug at one end and threaded at the other end, a fixed support having an axial hole, bearing seats at the ends of said hole, bearings in said seats for supporting said tube, fan blades fixedly mounted on the tube, there being holes in the tube walls adjacent the bearings, and a grease cup threaded to the end of the tube to deliver grease into the inside of the tube.

5. An exhaust fan, a tube having a plug at one end and threaded at the other end, a fixed support having an axial hole, bearing seats at the ends of said hole, bearings in said seats for supporting said tube, fan blades fixedly mounted on the tube adjacent one of said bearings, a pulley mounted on the tube adjacent the other bearing, there being holes in the tube walls adjacent the bearings, and a grease cup threaded to the end of the tube to deliver grease into the inside of the tube.

WALTER J. SMART.